(12) United States Patent
Momose et al.

(10) Patent No.: US 10,527,472 B2
(45) Date of Patent: Jan. 7, 2020

(54) EXCITATION CIRCUIT FOR ELECTROMAGNETIC FLOWMETER, AND ELECTROMAGNETIC FLOWMETER

(71) Applicant: AZBIL CORPORATION, Chiyoda-ku (JP)

(72) Inventors: Osamu Momose, Chiyoda-ku (JP); Kouichi Mamada, Chiyoda-ku (JP)

(73) Assignee: AZBIL CORPORATION, Chiyoda-ku (JP)

( * ) Notice: Subject to any disclaimer, the term of this patent is extended or adjusted under 35 U.S.C. 154(b) by 0 days.

(21) Appl. No.: 16/299,817

(22) Filed: Mar. 12, 2019

(65) Prior Publication Data

US 2019/0285447 A1    Sep. 19, 2019

(30) Foreign Application Priority Data

Mar. 13, 2018   (JP) ................. 2018-045393

(51) Int. Cl.
*G01F 1/60* (2006.01)
*G01F 1/58* (2006.01)

(52) U.S. Cl.
CPC ............. *G01F 1/60* (2013.01); *G01F 1/588* (2013.01)

(58) Field of Classification Search
None
See application file for complete search history.

(56) References Cited

U.S. PATENT DOCUMENTS

2018/0128663 A1*  5/2018  Momose ............... G01F 1/588
2018/0128665 A1*  5/2018  Momose ............... G01F 1/588

FOREIGN PATENT DOCUMENTS

| JP | 53-020956 | 2/1978 |
| JP | 2007-298402 | 11/2007 |
| JP | 2014-169871 | 9/2014 |

* cited by examiner

*Primary Examiner* — Harshad R Patel
(74) *Attorney, Agent, or Firm* — Oblon, McClelland, Maier & Neustadt, L.L.P.

(57) ABSTRACT

A voltage switching circuit applies a high excitation voltage to an excitation switching circuit during a period from an excitation period starting point to a rise point in an excitation period, and applies a low excitation voltage lower than the high excitation voltage to the excitation switching circuit during a period from the rise point to an excitation period ending point in the excitation period. A constant current circuit makes the current of the low excitation voltage to be input from a power supply circuit to the voltage switching circuit constant.

6 Claims, 6 Drawing Sheets

EXCITATION CIRCUIT FOR ELECTROMAGNETIC FLOWMETER, AND ELECTROMAGNETIC FLOWMETER

CROSS-REFERENCE TO RELATED APPLICATIONS

The present application is based on and claims priority to Japanese Application No. 2018-045393, filed Mar. 13, 2018, the entire contents of which are incorporated herein by reference.

BACKGROUND DISCLOSURE

1. Field Disclosure

The present disclosure relates to an electromagnetic flowmeter that measures the flow rate of a fluid in various process systems, and an excitation circuit that supplies an excitation current to an excitation coil of the electromagnetic flowmeter.

2. Description of the Related Art

An electromagnetic flowmeter typically includes an excitation coil that generates a magnetic field in a direction perpendicular to a flow direction of a fluid flowing in a measuring pipe, and a pair of detecting electrodes disposed in the measuring pipe in a direction orthogonal to the magnetic field generated by the excitation coil. Such an electromagnetic flowmeter measures the flow rate of a fluid flowing in the measuring pipe by detecting an electromotive force generated between the detecting electrodes while alternating the polarity of an excitation current to be supplied to the excitation coil.

In an electromagnetic flowmeter, it is important to accurately measure the flow rate of a fluid to be detected, that is, to improve measurement stability. Various techniques for improving measurement stability of an electromagnetic flowmeter have been studied. The details will be described below.

One method is to switch the direction of an excitation current to be supplied to an excitation coil at a shorter interval, that is, to increase an excitation frequency. This method makes it possible to reduce 1/f noise included in a flow rate signal that is based on the above-described electromotive force and to improve the signal-to-noise (S/N) ratio.

In a typical electromagnetic flowmeter, various noises such as electrochemical noise, fluid noise, and slurry noise are superimposed on an electromotive force detected by detecting electrodes. These noises have a so-called 1/f characteristic in which the noise level is higher in a lower frequency band. Thus, increasing the excitation frequency improves the S/N ratio of the electromotive force, and accordingly the value of the flow rate can be accurately calculated.

When a rectangular-wave alternating-current (AC) voltage is applied to an excitation coil, the self-inductance of the excitation coil causes an excitation current to rise gradually. Thus, an increase in excitation frequency increases the ratio of an excitation current rise period to a period over which the excitation coil is excited in one direction, resulting in a shorter period over which a magnetic field with constant strength is generated. As a result, a flow rate signal based on the electromotive force detected by the detecting electrodes has a shorter steady-state period over which the voltage is flat. Thus, it is difficult to stably sample the flow rate signal, and a measurement error in the value of the flow rate increases. For this reason, it is important to achieve a quick rise of the excitation current even at a high excitation frequency.

For example, Japanese Unexamined Patent Application Publication No. 53-20956 discloses a technique related to an excitation circuit that supplies an excitation current to an excitation coil. In this technique, to achieve a quick rise of the excitation current when the polarity of the excitation current (hereinafter referred to as "excitation polarity") is switched at an increased excitation frequency, two power supplies having different voltages are prepared in advance, the excitation coil is excited by the higher voltage at the rise time of the excitation current, and the excitation coil is excited by the lower voltage in an steady state.

Japanese Unexamined Patent Application Publication No. 2014-169871 discloses a technique for switching an excitation voltage to achieve a quick rise of an excitation current at the time of switching the excitation polarity. FIG. 5 is a circuit diagram illustrating an excitation circuit according to the related art. As illustrated in FIG. 5, in the related art, two power supply voltages, that is, a high excitation voltage VexH and a low excitation voltage VexL, are prepared in advance, and the high excitation voltage VexH or the low excitation voltage VexL is selectively supplied to an excitation switching circuit LSW in accordance with whether or not an excitation current Iex has reached a set current value.

Specifically, a voltage switching circuit PSW supplies the high excitation voltage VexH when excitation starts, and switches the voltage to supply the low excitation voltage VexL at a rise point at which a rise detecting circuit DET detects that the excitation current Iex has reached the set current value. The switching from the high excitation voltage VexH to the low excitation voltage VexL reduces heat generation by a power MOSFET Q52 of a constant current circuit CCS that is connected to the excitation switching circuit LSW and that makes the excitation current Iex constant.

In the related art described in Japanese Unexamined Patent Application Publication No. 2014-169871, it is necessary to achieve a quicker rise of the excitation current when the excitation frequency is to be further increased to reduce 1/f noise included in a flow rate signal and to improve the S/N ratio. For this purpose, it is necessary to increase the high excitation voltage VexH.

However, increasing the high excitation voltage VexH causes an increase in drain-source voltage Vds of the power MOSFET Q52 of the constant current circuit CCS in FIG. 5 and an increase in heat generation by the power MOSFET Q52, resulting in the need for a large radiator. In addition, the increase in drain-source voltage Vds of the power MOSFET Q52 results in the need for replacing the power MOSFET Q52 with a component having a higher rated voltage of the drain-source voltage Vds.

FIG. 6 is a signal waveform diagram illustrating the operation of the excitation circuit according to the related art. As illustrated in FIG. 6, a period from time T1 to time T4 is a positive excitation period TP, and a period from time T4 to next time T1 is a negative excitation period TN. At the beginning of the positive excitation period TP and the negative excitation period TN, switching from the high excitation voltage VexH to the low excitation voltage VexL is performed. For example, in the positive excitation period TP starting from time T1, a period from time T1 to time T3 is a high-voltage excitation period, and a period from time T3 to time T4 is a low-voltage excitation period.

Polarity switching signals EXD1 and EXD2 are switched at time T1, and the polarity of the excitation current Iex gradually changes from negative to positive to substantially reach a preset value at time T2. A power MOSFET Q51 is kept in an ON-state until time T3 at which the excitation current Iex becomes sufficiently stable because the voltage switching circuit PSW may cause chattering if overshoot or undershoot of the excitation current Iex occurs.

A current route from time T2 to time T3 is as follows: VexH→Q51→point A→SW53→Lex→SW52→point B→Q52→R53→VexCOM. Normally, the ON resistance of each of the power MOSFET Q51 and the switches SW52 and SW53 is very small. Thus, when a voltage drop resulting from the ON resistance is disregarded, the drain-source voltage Vds of the power MOSFET Q52 (Vds (Q52)) is expressed by Vds (Q52)=VexH−Vex−Vs. Vex represents an excitation voltage (the voltage across the excitation coil Lex), and Vs represents a detected voltage of a current detecting resistor R55.

When the high excitation voltage VexH is further increased by ΔVexH to achieve a quicker rise of the excitation current Iex, the constant current circuit CCS performs constant current control so that the excitation current Iex is kept constant even when the high excitation voltage VexH increases, and thus a potential VB at point B increases. That is, the increase in the high excitation voltage VexH corresponds to an increase in the drain-source voltage Vds of the power MOSFET Q52.

Thus, an increase in power consumption ΔP of the power MOSFET Q52 is expressed by ΔP (Q52)=ΔVexH×Iex, and it is understood that heat generation by the power MOSFET Q52 increases. Accordingly, it is necessary to use a large radiator and to replace the power MOSFET Q52 with a power MOSFET having a high maximum rating of output.

In recent years, compact (capacitive) electromagnetic flowmeters directed to the factory automation (FA) market, such as the one disclosed in Japanese Unexamined Patent Application Publication No. 2007-298402, have been put to practical use. However, restrictions in design conditions involved in the reduction in size deteriorate measurement stability. That is, a circuit according to the related art has no space for providing a radiator for a power MOS-FET, and thus the excitation current Iex needs to be decreased. To increase the excitation frequency, it is necessary to increase the excitation voltage Vex at the time of switching the excitation polarity and to speed the rise of the excitation current Iex. However, the increase in the excitation voltage Vex increases heat generation by the power transistor, as described above, and thus it is necessary to further decrease the excitation current Tex.

SUMMARY

The present disclosure has been made to address the foregoing issues, and an object of the present disclosure is to provide an electromagnetic flowmeter capable of reducing heat generation by a power transistor used in a constant current circuit for stabilizing an excitation current.

An excitation circuit according to an embodiment of the present disclosure includes an excitation switching circuit that switches, in each of a positive excitation period and a negative excitation period repeated at a constant interval, a polarity of an excitation current to be supplied to an excitation coil of an electromagnetic flowmeter between a positive polarity and a negative polarity; a rise detecting circuit that detects, in each of the positive excitation period and the negative excitation period, a rise point at which a current value of the excitation current reaches a set current value that is set in advance; a voltage switching circuit that applies a high excitation voltage to the excitation switching circuit during a period from an excitation period starting point to the rise point in each of the positive excitation period and the negative excitation period, and applies a low excitation voltage lower than the high excitation voltage to the excitation switching circuit during a period from the rise point to an excitation period ending point in each of the positive excitation period and the negative excitation period; and a constant current circuit that makes a current of the low excitation voltage to be supplied to the voltage switching circuit constant.

In one example configuration of the excitation circuit, the constant current circuit includes a transistor including an input terminal that is supplied with the low excitation voltage through a first current detecting element and an output terminal that is connected to the voltage switching circuit; and an operational amplifier that makes a comparison between a first detected voltage with a first reference voltage and that controls the transistor on the basis of an obtained result of the comparison, the first detected voltage being lower than the low excitation voltage by a drop voltage generated by the first current detecting element in accordance with a current flowing through the transistor, the first reference voltage being lower than the low excitation voltage by a constant voltage.

In one example configuration of the excitation circuit, the constant current circuit includes a transistor including an input terminal that is supplied with the low excitation voltage and an output terminal that is connected to the voltage switching circuit; and an operational amplifier that makes a comparison between a second detected voltage with a second reference voltage and that controls the transistor on the basis of an obtained result of the comparison, the second detected voltage being higher than a ground potential of the excitation circuit by a voltage generated by a second current detecting element in accordance with the excitation current, the second reference voltage being higher than the ground potential by a constant voltage.

In one example configuration of the excitation circuit, the rise detecting circuit includes a comparator including a first input terminal that receives a threshold voltage higher than a ground potential of the excitation circuit by a constant voltage, a second input terminal that receives a third detected voltage higher than the ground potential by a voltage generated by a third current detecting element that detects the excitation current, and an output terminal. The comparator makes a comparison between the threshold voltage and the third detected voltage and outputs, on the basis of an obtained result of the comparison, a comparison output signal indicating the rise point from the output terminal to the voltage switching circuit, the comparison being performed on the basis of a hysteresis characteristic that is obtained by shifting an input voltage of the first input terminal or the second input terminal in accordance with the comparison output signal.

In one example configuration of the excitation circuit, the rise detecting circuit includes a comparator including a non-inverting input terminal that receives a threshold voltage which is higher than a ground potential of the excitation circuit by a constant voltage and which has a constant output resistance value, an inverting input terminal that receives a third detected voltage higher than the ground potential by a voltage generated by a third current detecting element that detects the excitation current, and an output terminal that outputs a comparison output signal indicating the rise point to the voltage switching circuit on the basis of a result of a comparison between the threshold voltage and the third detected voltage; and a resistance element including a first end connected to the non-inverting input terminal of the comparator and a second end connected to the output terminal of the comparator.

An electromagnetic flowmeter according to an embodiment of the present disclosure includes an excitation coil that generates a magnetic field in a direction perpendicular to a flow direction of a fluid flowing in a measuring pipe; an excitation circuit that switches a polarity of an excitation current to be supplied to the excitation coil at a constant interval; a pair of detecting electrodes that detects an electromotive force generated in the fluid; and a control circuit that calculates a flow rate of the fluid from the electromotive force detected by the pair of detecting electrodes. The excitation circuit includes the above-described excitation circuit.

According to an embodiment of the present disclosure, the constant current circuit is not supplied with the high excitation voltage and makes only the current of the low excitation voltage constant. Thus, heat generation by the transistor, such as a power MOSFET, of the constant current circuit caused by application of the high excitation voltage according to the related art can be prevented, and heat generation by the power transistor can be reduced.

Thus, it is not necessary to use a large radiator for the transistor and to replace the transistor with a high-withstand-voltage transistor. Since heat generation by the transistor is suppressed, it is possible to achieve a quick rise of the excitation current by increasing the excitation voltage at the time of switching the excitation polarity to increase the excitation frequency. Accordingly, it becomes possible to easily obtain compact electromagnetic flowmeters that are widely used in the FA market and that have favorable measurement stability.

DETAILED DESCRIPTION

Hereinafter, embodiments of the present disclosure will be described with reference to the drawings.

First Embodiment

Figure 1:
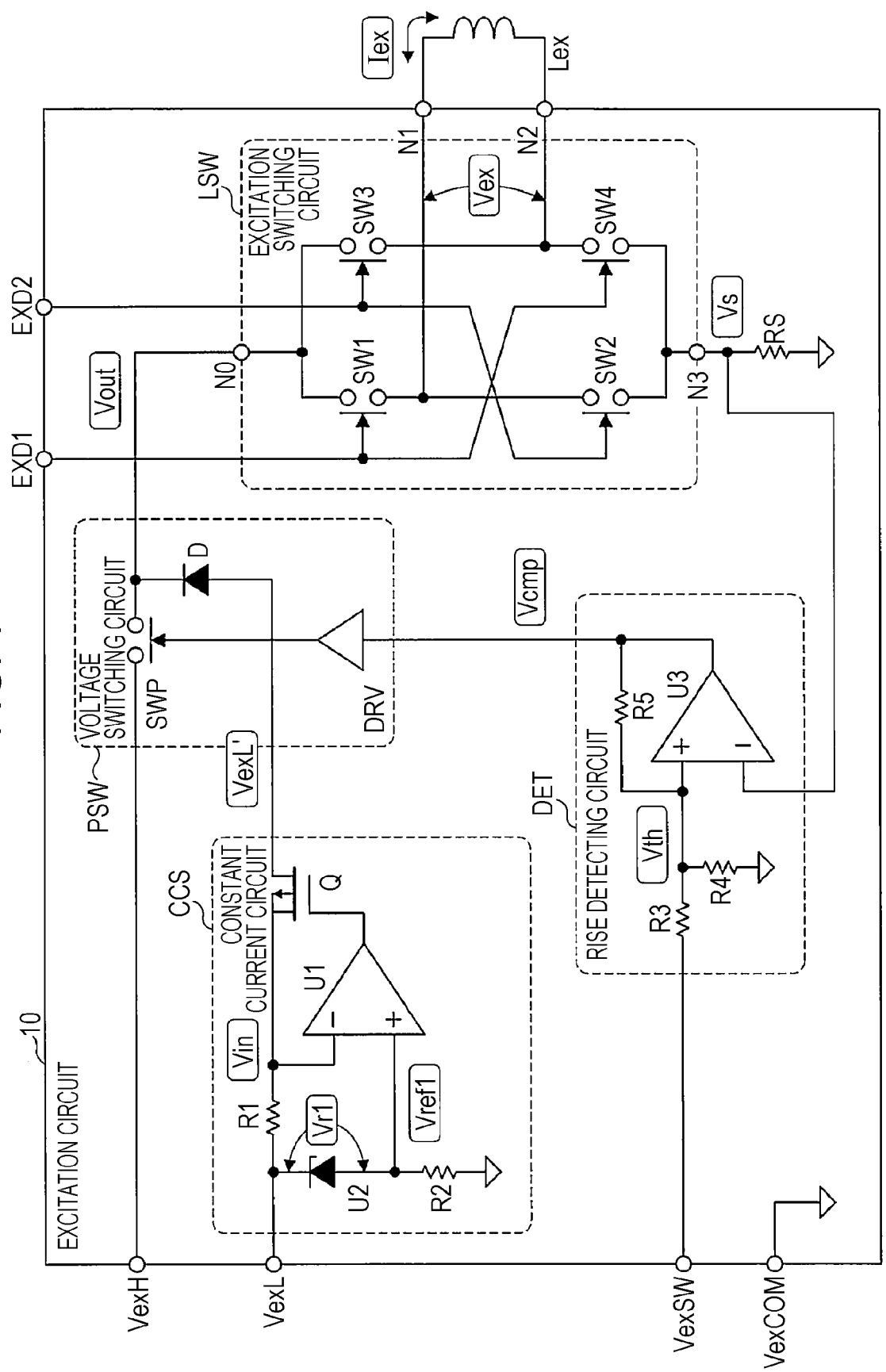
FIG. 1 is a circuit diagram illustrating an excitation circuit according to a first embodiment.
Figure 2:
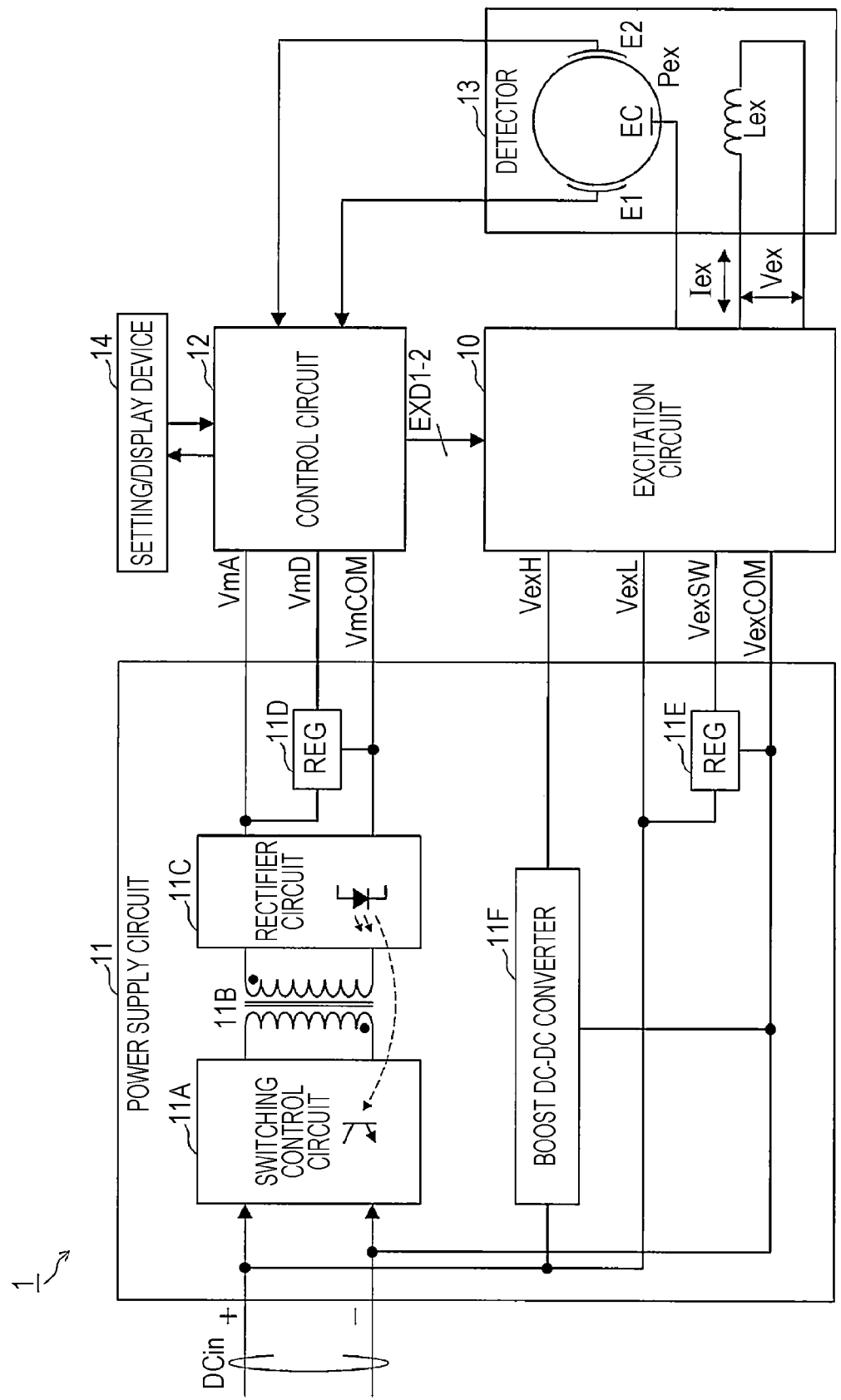
FIG. 2 is a block diagram illustrating the configuration of an electromagnetic flowmeter.

First, an excitation circuit 10 according to a first embodiment of the present disclosure and an electromagnetic flowmeter 1 using the excitation circuit 10 will be described with reference to FIGS. 1 and 2. FIG. 1 is a circuit diagram illustrating the excitation circuit 10 according to the first embodiment. FIG. 2 is a block diagram illustrating the configuration of the electromagnetic flowmeter 1.

Electromagnetic Flowmeter

The electromagnetic flowmeter 1 according to an embodiment of the present disclosure is a device that measures the flow rate of a conductive fluid. In the electromagnetic flowmeter 1, an excitation coil Lex disposed so as to generate a magnetic field in a direction perpendicular to a flow direction of a fluid flowing in a measuring pipe Pex is supplied with an excitation current Iex whose polarity alternates, thereby detecting an electromotive force generated between a pair of detecting electrodes E1 and E2 disposed on the measuring pipe Pex so as to be orthogonal to the magnetic field generated by the excitation coil Lex. The electromotive force is amplified and is then subjected to sampling and signal processing to measure the flow rate of the fluid flowing in the measuring pipe Pex.

As illustrated in FIG. 2, the electromagnetic flowmeter 1 includes a power supply circuit 11, a control circuit 12, the excitation circuit 10, a detector 13, and a setting/display device 14, which serve as main circuit units.

The power supply circuit 11 has a function of generating various power supply voltages from a direct-current (DC) power supply DCin and supplying the voltages to the control circuit 12 and the excitation circuit 10. The power supply circuit 11 includes a switching control circuit 11A, a transformer 11B, a rectifier circuit 11C, voltage regulators (REGs) 11D and 11E, and a boost DC-DC converter 11F, which serve as main circuit units.

The switching control circuit 11A switches a DC voltage of the DC power supply DCin at a high frequency and supplies the DC voltage to a primary winding of the transformer 11B. The rectifier circuit 11C rectifies a high-frequency signal output from a secondary winding of the transformer 11B to generate a DC operating voltage VmA (for example, 24 V) for analog signal processing and a ground potential (common voltage) VmCOM (for example, 0 V) and supplies the operating voltage VmA and the ground potential VmCOM to the control circuit 12. The voltage regulator 11D generates an operating voltage VmD (for example, 5 V) for digital signal processing from the operating voltage VmA and supplies the operating voltage VmD to the control circuit 12.

The boost DC-DC converter 11F generates a DC high excitation voltage VexH (for example, 80 V) and a ground potential VexCOM (for example, 0 V) of the excitation circuit 10 from the DC power supply DCin and supplies the high excitation voltage VexH and the ground potential VexCOM to the excitation circuit 10. The DC power supply DCin (for example, 24 V) supplies a DC low excitation voltage VexL to the excitation circuit 10. The voltage regulator 11E generates a rise detecting voltage VexSW (for example, 10 V) from the low excitation voltage VexL and supplies the rise detecting voltage VexSW to the excitation circuit 10.

The control circuit 12 includes circuit units, such as a central processing unit (CPU), a signal processing circuit, and a transmission interface (I/F) circuit, and has a function of controlling the excitation circuit 10, calculating a flow rate based on an electromotive force detected by the detecting electrodes E1 and E2 of the detector 13, and outputting a flow rate signal to a higher-order device.

The excitation circuit 10 has a function of supplying the excitation coil Lex of the detector 13 with the excitation current Iex whose excitation polarity is switched at a constant interval on the basis of control of the control circuit 12. To achieve a quick rise of the excitation current Iex at the time of switching the excitation polarity as in the related art, two power supply voltages, that is, the high excitation voltage VexH and the low excitation voltage VexL, are prepared in advance, and the excitation circuit 10 uses the high excitation voltage VexH for excitation at the rise time of the excitation current Iex, and uses the low excitation voltage VexL for excitation in a steady state.

The detector 13 includes the measuring pipe Pex in which a fluid as a target of flow rate measurement flows; the excitation coil Lex that generates, to the measuring pipe Pex, a magnetic field by using the excitation current Iex from the excitation circuit 10; the pair of detecting electrodes E1 and E2 disposed on the measuring pipe Pex, and a common electrode EC that is separated from the detecting electrodes E1 and E2, is to be in contact with a fluid, and is connected to the ground potential VmCOM.

The setting/display device 14 has a function of detecting an input of a setting operation by an operator and outputting the input to the control circuit 12 and a function of displaying an output from the control circuit 12 by using a light emitting diode (LED) or a liquid crystal display (LCD).

Excitation Circuit

Now, the excitation circuit 10 according to the first embodiment will be described with reference to FIG. 1.

Figure 5:
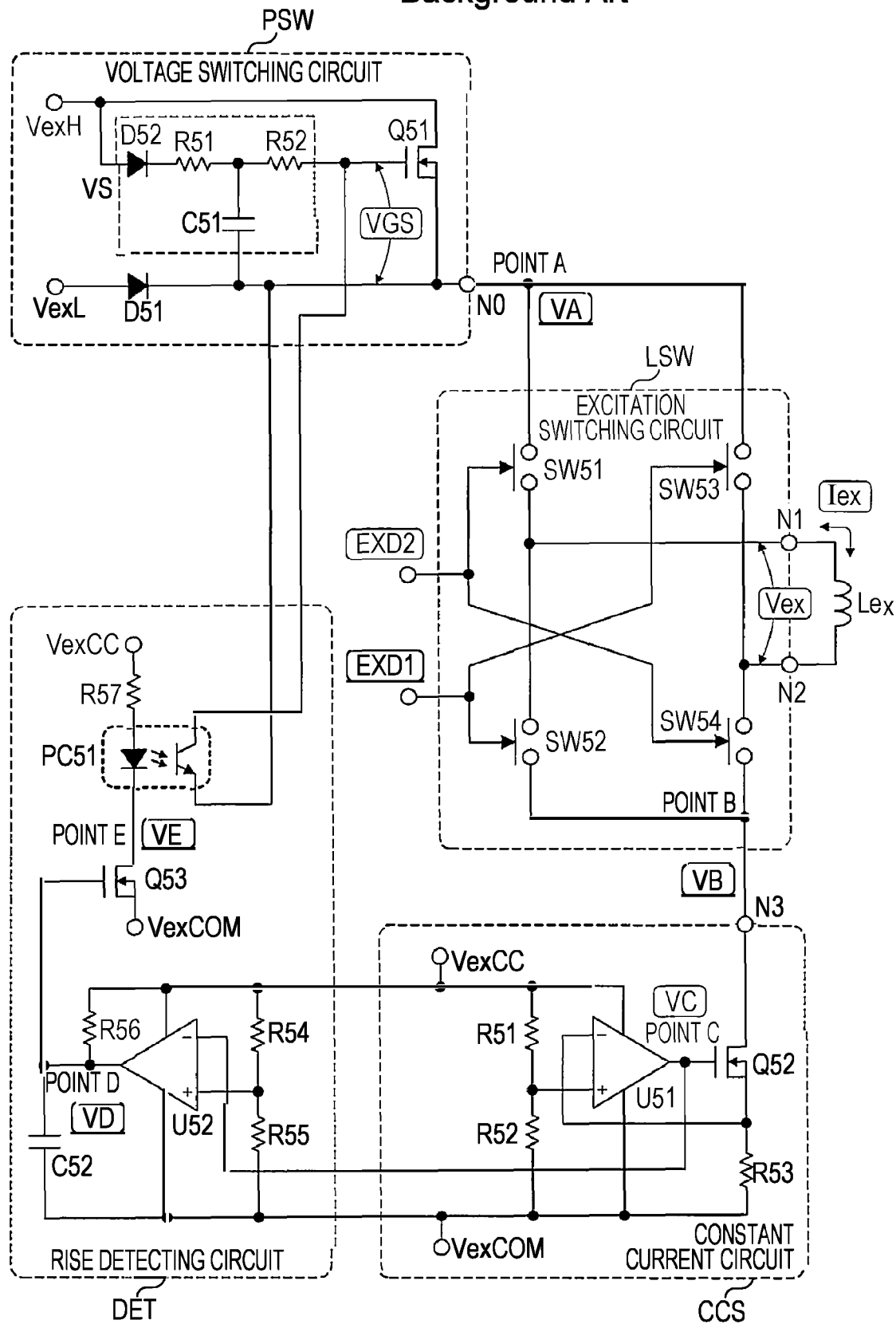
FIG. 5 is a circuit diagram illustrating an excitation circuit according to the related art.
Figure 6:
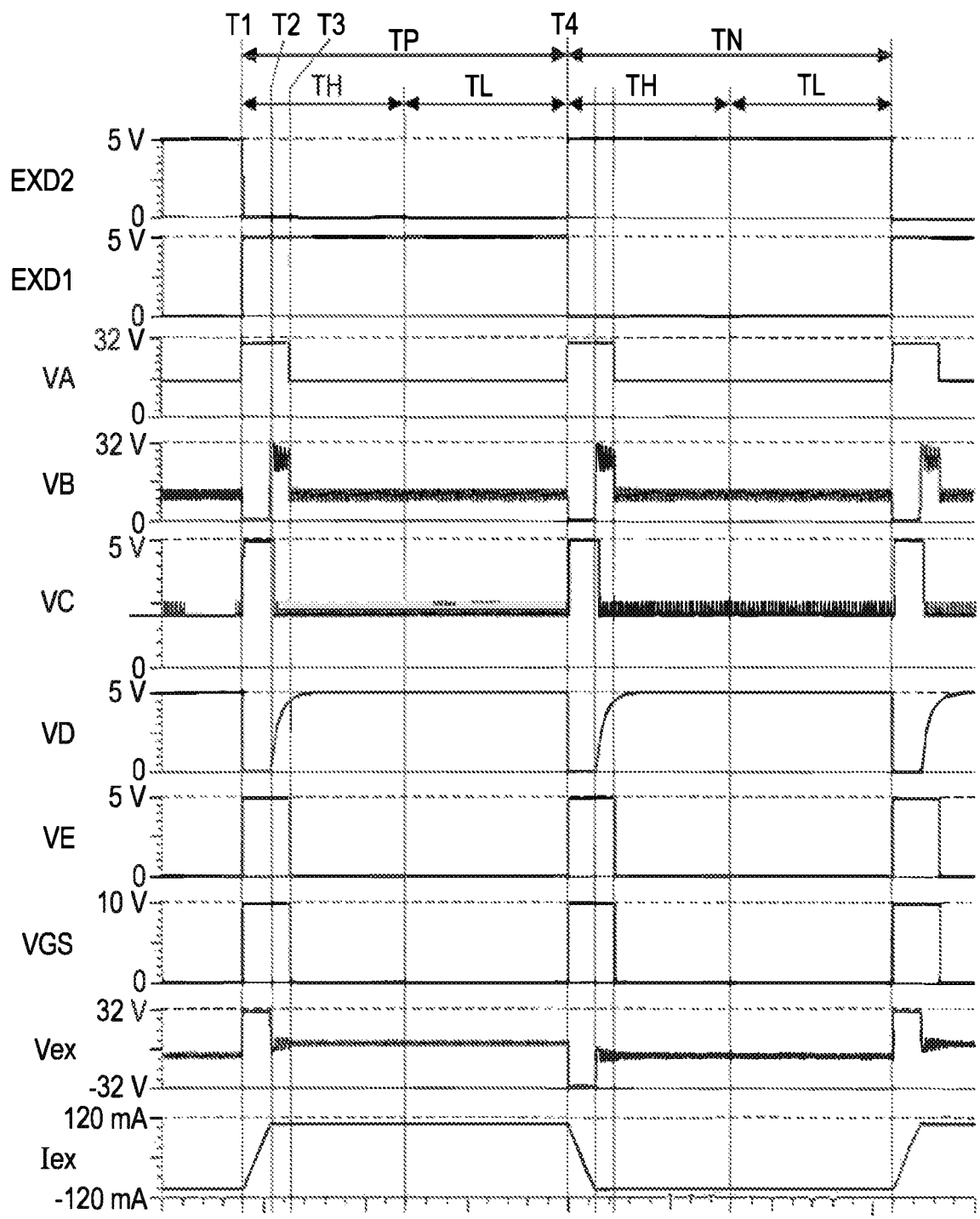
FIG. 6 is a signal waveform diagram illustrating the operation of the excitation circuit according to the related art.

The excitation circuit 10 according to the first embodiment is different from the above-described excitation circuit according to the related art illustrated in FIG. 5 in that the constant current circuit CCS is disposed on the path for supplying the low excitation voltage VexL, a resistance element RS is connected at the portion where the constant current circuit CCS is connected in the related art, and a detected voltage Vs at a node N3, which is an end point of the resistance element RS near the excitation switching circuit LSW, is input to the rise detecting circuit DET.

As illustrated in FIG. 1, the excitation circuit 10 includes an excitation switching circuit LSW, a rise detecting circuit DET, a voltage switching circuit PSW, and a constant current circuit CCS.

The excitation switching circuit LSW has a function of switching, in each of a positive excitation period TP and a negative excitation period TN repeated at a constant interval, the polarity of the excitation current Iex to be supplied to the excitation coil Lex between a positive polarity and a negative polarity.

Specifically, the excitation switching circuit LSW controls the switching of switches SW1, SW2, SW3, and SW4 on the basis of polarity switching signals EXD1 and EXD2 from the control circuit 12, thereby switching the polarity of a supply voltage Vout supplied from the voltage switching circuit PSW to a node N0, which is an input terminal of the excitation switching circuit LSW, and applying the supply voltage Vout to the excitation coil Lex connected between nodes N1 and N2.

The switches SW1 and SW4 are switches that are in an ON-state during the positive excitation period TP and are in an OFF-state during the negative excitation period TN to switch the polarity of the excitation current Iex to positive and apply the excitation current Iex when the excitation polarity is switched in the positive excitation period TP and the negative excitation period TN during the period corresponding to a constant interval Tex (=TN+TP). The switches SW2 and SW3 are switches that are in an ON-state during the negative excitation period TN and are in an OFF-state during the positive excitation period TP to switch the polarity of the excitation current Iex to negative and apply the excitation current Iex.

Specifically, the switch SW1 is connected between the nodes N0 and N1 and is turned ON/OFF in response to the polarity switching signal EXD1. The switch SW2 is connected between the node N1 and the node N3 which is an output terminal of the excitation switching circuit LSW and is turned ON/OFF in response to the polarity switching signal EXD2. The switch SW3 is connected between the nodes N0 and N2 and is turned ON/OFF in response to the polarity switching signal EXD2. The switch SW4 is connected between the nodes N2 and N3 and is turned ON/OFF in response to the polarity switching signal EXD1. Each of the switches SW1, SW2, SW3, and SW4 may be formed of an existing circuit including a photo coupler or an optical metal-oxide-semiconductor field-effect transistor (MOSFET).

The rise detecting circuit DET has a function of detecting, in each of the positive excitation period TP and the negative excitation period TN, a rise point at which the excitation current Iex reaches a set current value that is set in advance.

Specifically, the rise detecting circuit DET compares, using a comparator U3, the detected voltage (third detected voltage) Vs that changes in accordance with the excitation current Iex with a threshold voltage Vth obtained from the rise detecting voltage VexSW, and outputs, on the basis of an obtained result of the comparison, a comparison output signal Vcmp indicating a rise point from the comparator U3 to the voltage switching circuit PSW.

At this time, a non-inverting input terminal (+) of the comparator U3 receives the threshold voltage Vth that is obtained by dividing the voltage difference between the rise detecting voltage VexSW and the ground potential VexCOM by resistance elements R3 and R4 and that has a constant output resistance value. An inverting input terminal (−) of the comparator U3 is connected between the excitation switching circuit LSW (N3) and the resistance element (third current detecting element) RS connected between the excitation switching circuit LSW and the ground potential VexCOM. The inverting input terminal (−) receives the detected voltage (second detected voltage) Vs higher than the ground potential VexCOM by a voltage generated by the resistance element RS in accordance with the excitation current Iex. In addition, a resistance element R5 is connected between the non-inverting input terminal (+) and an output terminal of the comparator U3.

With this configuration, the threshold voltage Vth changes in accordance with the output voltage of the comparator U3, and thus the comparator U3 operates as a hysteresis comparator. In this case, the threshold voltage Vth is set by selecting the values of the resistance elements R3, R4, and R5 so that the excitation current Iex is equal to or slightly larger than the set current value at the rise point (time T2) at which the comparison output signal Vcmp is switched from a H level to a L level. That is, the threshold voltage Vth is set to a value equal to the value of the detected voltage Vs that is generated when the excitation current Iex is the set current value or slightly larger. Accordingly, the threshold value Vth is decreased when the detected voltage Vs exceeds the threshold voltage Vth. Thus, the operation of the comparator U3 is stabilized even if the excitation current Iex fluctuates around the set current value.

The circuit configuration of the comparator U3 for obtaining a hysteresis characteristic is not limited to the example circuit configuration including the resistance element R5 illustrated in FIG. 1. The hysteresis characteristic may be obtained by shifting, in accordance with the comparison output signal Vcmp, either of the threshold voltage Vth input to one of the non-inverting input terminal (+) and the inverting input terminal (−) of the comparator U3 and the detected voltage Vs input to the other. For example, the detected voltage Vs may be input to the non-inverting input terminal (+) of the comparator U3, the threshold voltage Vth may be input to the inverting input terminal (−), and the non-inverting input terminal (+) and the output terminal may be connected to each other by a resistance element, thereby obtaining a hysteresis characteristic.

The voltage switching circuit PSW has a function of applying the high excitation voltage VexH supplied from the power supply circuit 11 to the excitation switching circuit LSW during a period from time T1 which is an excitation period starting point to time T2 which is the rise point in each of the positive excitation period TP and the negative excitation period TN, that is, during a high-voltage excitation period TH, and applying the low excitation voltage VexL lower than the high excitation voltage VexH and supplied from the power supply circuit 11 to the excitation switching circuit LSW during a period from time T2 which is the rise point to time T1 which is an excitation period ending point, that is, during a low-voltage excitation period TL.

In this case, the voltage switching circuit PSW includes a switch SWP that is subjected to ON/OFF control of supply of the high excitation voltage VexH to the excitation switching circuit LSW, and performs ON/OFF control of the switch SWP by using an existing driver circuit DRV on the basis of the comparison output signal Vcmp from the rise detecting circuit DET.

Accordingly, during the high-voltage excitation period TH from time T1 as the starting point to time T2 as the rise point detected by the rise detecting circuit DET in each of the positive excitation period TP and the negative excitation period TN, the switch SWP is in an ON-state and the high excitation voltage VexH is applied to the excitation switching circuit LSW. During the low-voltage excitation period TL following the high-voltage excitation period TH, the low excitation voltage VexL (VexL') supplied from the constant current circuit CCS through a diode D for preventing backflow is supplied to the excitation switching circuit LSW.

The constant current circuit CCS has a function of making the current of the low excitation voltage VexL supplied from the power supply circuit 11 to the voltage switching circuit PSW constant.

Specifically, the constant current circuit CCS makes the current of the low excitation voltage VexL constant by controlling, using an operational amplifier U1, a transistor Q formed of a power MOSFET of a Pch type connected in series to the supply line of the low excitation voltage VexL, and supplies the current to the excitation switching circuit LSW through the diode D for preventing backflow.

In this case, the source terminal (input terminal) of the transistor Q is connected to the low excitation voltage VexL with a resistance element (first current detecting element) R1 interposed therebetween, and the drain terminal (output terminal) of the transistor Q is connected to the anode terminal of the diode D of the voltage switching circuit PSW. The gate terminal (control terminal) of the transistor Q is connected to the output terminal of the operational amplifier U1. The resistance element R1 only needs to detect the current flowing through the transistor Q, and an element or circuit other than a resistance element may be used.

The non-inverting input terminal (+) of the operational amplifier U1 is connected to the low excitation voltage VexL with a constant voltage output element U2 such as a shunt voltage reference element interposed therebetween, and receives a reference voltage Vref1 (first reference voltage) lower than the low excitation voltage VexL by a drop voltage (constant voltage) Vr1 in the constant voltage output element U2. In this case, the cathode terminal (input terminal) of the constant voltage output element U2 is connected to the low excitation voltage VexL, the anode terminal (output terminal) of the constant voltage output element U2 is connected to the ground potential VexCOM with a resistance element R2 interposed therebetween, and the non-inverting input terminal (+) of the operational amplifier U1 is connected to the anode terminal of the constant voltage output element U2.

The inverting input terminal (−) of the operational amplifier U1 is connected to the source terminal of the transistor Q and receives an input voltage Vin which is the voltage at the source terminal, that is, a detected voltage (first detected voltage) lower than the low excitation voltage VexL by a drop voltage generated in the resistance element R1 in accordance with the current flowing through the transistor Q.

Accordingly, the reference voltage Vref1 and the input voltage Vin are compared with each other by the operational amplifier U1, and the transistor Q is controlled by an obtained result of the comparison. Thus, the current value of the low excitation voltage VexL is controlled by the transistor Q so that the reference voltage Vref1 equals the input voltage Vin. As a result, the current of the low excitation voltage VexL to be supplied to the voltage switching circuit PSW is made constant.

Operation According to First Embodiment

Figure 3:
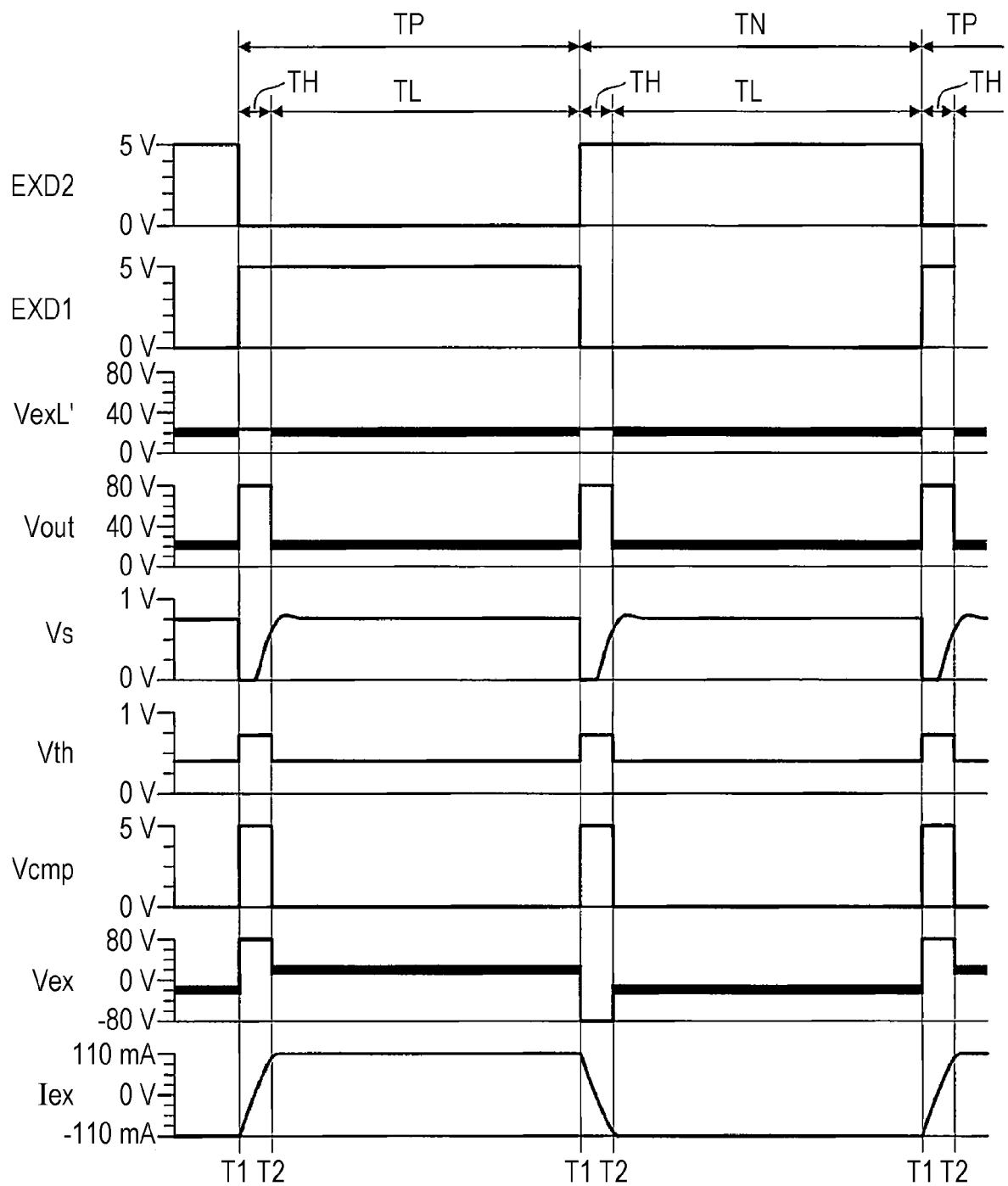
FIG. 3 is a signal waveform diagram illustrating the operation of the excitation circuit according to the first embodiment.

Next, an operation according to the first embodiment will be described with reference to FIG. 3. FIG. 3 is a signal waveform diagram illustrating the operation of the excitation circuit 10 according to the first embodiment.

In the positive excitation period TP, the polarity switching signal EXD1 is at a H level while the polarity switching signal EXD2 is at a L level. Accordingly, the switches SW1 and SW4 of the excitation switching circuit LSW are in an ON-state while the switches SW2 and SW3 are in an OFF-state, and thus the excitation current Iex flows from the node N1 to the node N2. On the other hand, in the negative excitation period TN, the polarity switching signal EXD1 is at a L level while the polarity switching signal EXD2 is at a H level. Accordingly, the switches SW1 and SW4 are in an OFF-state while the switches SW2 and SW3 are in an ON-state, and thus the excitation current Iex flows from the node N2 to the node N1.

Each of the positive excitation period TP and the negative excitation period TN includes the high-voltage excitation period TH which is at the top of the positive excitation period TP or the negative excitation period TN and over which the high excitation voltage VexH is applied, and the low-voltage excitation period TL which follows the high-voltage excitation period TH and over which the low excitation voltage VexL is applied.

The rise detecting circuit DET compares the detected voltage Vs with the threshold voltage Vth to obtain the comparison output signal Vcmp, and controls the switching of the voltage switching circuit PSW by using the comparison output signal Vcmp.

The polarity of the excitation current Iex is switched at time T1 when the high-voltage excitation period TH starts in each of the positive excitation period TP and the negative excitation period TN. Upon application of the high excitation voltage VexH being started at time T1, the current value gradually rises to the set current value that is set in advance, and the detected voltage Vs also rises accordingly. When the detected voltage Vs is lower than the threshold voltage Vth, the comparator U3 of the rise detecting circuit DET outputs the comparison output signal Vcmp indicating a H level. Accordingly, the voltage switching circuit PSW enters an ON-state, and application of the high excitation voltage VexH to the excitation switching circuit LSW is maintained.

After that, the comparator U3 outputs the comparison output signal Vcmp indicating a L level at the rise point where the detected voltage Vs is above the threshold voltage Vth, that is, at time T2 when the low-voltage excitation period TL starts. Accordingly, the voltage switching circuit PSW enters an OFF-state and the high excitation voltage VexH is disconnected. Thus, the low excitation voltage VexL', which is obtained by making the low excitation voltage VexL constant by the constant current circuit CCS, is applied to the excitation switching circuit LSW through the diode D.

The operational amplifier U1 of the constant current circuit CCS constantly compares the input voltage Vin of the source terminal of the transistor Q with the reference voltage Vref1 and controls the transistor Q in accordance with a result of the comparison. Accordingly, the transistor Q is controlled so that the input voltage Vin equals the reference voltage Vref1, that is, the voltage across the resistance element R1 (VexL−Vin) equals the constant voltage Vr1. As a result, the current of the low excitation voltage VexL flowing through the resistance element R5 is made constant and is supplied to the excitation switching circuit LSW.

Advantages of First Embodiment

As described above, in the first embodiment, the voltage switching circuit PSW applies the high excitation voltage VexH to the excitation switching circuit LSW during the period from the excitation period starting point to the rise point in the excitation period, and applies the low excitation voltage VexL lower than the high excitation voltage VexH to the excitation switching circuit LSW during the period from the rise point to the excitation period ending point. The constant current circuit CCS makes the current of the low excitation voltage VexL to be input from the power supply circuit 11 to the voltage switching circuit PSW constant.

Accordingly, the constant current circuit CCS is not applied with the high excitation voltage VexH, and makes only the current of the low excitation voltage VexL constant. Thus, heat generation by the transistor Q, formed of a power MOSFET or the like, of the constant current circuit CCS caused by application of the high excitation voltage VexH according to the related art can be avoided, and the amount of heat generation by the transistor Q can be reduced.

Thus, it is not necessary to use a large radiator for the transistor Q, and it is not necessary to replace the transistor Q with a high-withstand-voltage power transistor Q. Since heat generation by the transistor Q can be suppressed, the excitation voltage Vex at the time of switching the excitation polarity can be increased to increase the excitation frequency, thereby achieving quick rise of the excitation current Iex. Accordingly, it becomes possible to easily obtain compact electromagnetic flowmeters that are widely used in the FA market and that have favorable measurement stability.

In the first embodiment, the constant current circuit CCS may include the transistor Q including an input terminal that is supplied with the low excitation voltage VexL through the resistance element R1 and an output terminal that is connected to the voltage switching circuit PSW, and the operational amplifier U1 that compares the reference voltage Vref1, which is lower than the low excitation voltage VexL by the constant voltage Vr1, with the input voltage Vin of the input terminal, and that controls the transistor Q on the basis of an obtained result of the comparison.

Accordingly, the reference voltage Vref1 changes following the low excitation voltage VexL, which makes it possible to stably make the low excitation voltage VexL constant even when the value of the low excitation voltage VexL fluctuates.

In the first embodiment, the rise detecting circuit DET may include the comparator U3 including a first input terminal that receives the threshold voltage Vth higher than the ground potential VexCOM by a constant voltage, a second input terminal that receives the detected voltage Vs higher than the ground potential VexCOM by the voltage generated by the resistance element RS that detects the excitation current Iex, and an output terminal. The comparator U3 may compare the threshold voltage Vth with the detected voltage Vs and output, on the basis of an obtained result of the comparison, the comparison output signal Vcmp indicating the rise point from the output terminal to the voltage switching circuit PSW. The comparison may be performed on the basis of a hysteresis characteristic that is obtained by shifting the input voltage of the first input terminal or the second input terminal in accordance with the comparison output signal Vcmp.

More specifically, the rise detecting circuit DET may include the comparator U3 including the non-inverting input terminal (+) that receives the threshold voltage Vth having a constant output resistance value, the inverting input terminal (−) that receives the detected voltage Vs that changes in accordance with the excitation current Iex, and the output terminal that outputs the comparison output signal Vcmp indicating the rise point to the voltage switching circuit PSW on the basis of a result of comparison between the threshold voltage Vth and the detected voltage Vs; and the resistance element R5 including a first end connected to the non-inverting input terminal (+) of the comparator U3 and a second end connected to the output terminal of the comparator U3.

Accordingly, the threshold voltage Vth is switched on the basis of the comparison output signal Vcmp, and the threshold voltage Vth is decreased at the point of time when the detected voltage Vs exceeds the threshold voltage Vth. Thus, the comparator U3 is able to perform comparison on the basis of a hysteresis characteristic. Therefore, the comparison output signal Vcmp can be stably output without causing chattering even when the excitation current Iex fluctuates around the set current value. Accordingly, the voltage switching circuit PSW can be stably controlled, it is not necessary to wait until the excitation current Iex is stabilized, and the range of variation of the low excitation voltage VexL' after the current has been made constant can be reduced. In addition, since it is not necessary to accurately adjust the operating point of the comparator U3 to the set current value, it is not necessary to use a highly accurate reference element as the reference voltage of the comparator U3, and a general power supply voltage (for example, VexSW) can be used.

Second Embodiment

Figure 4:
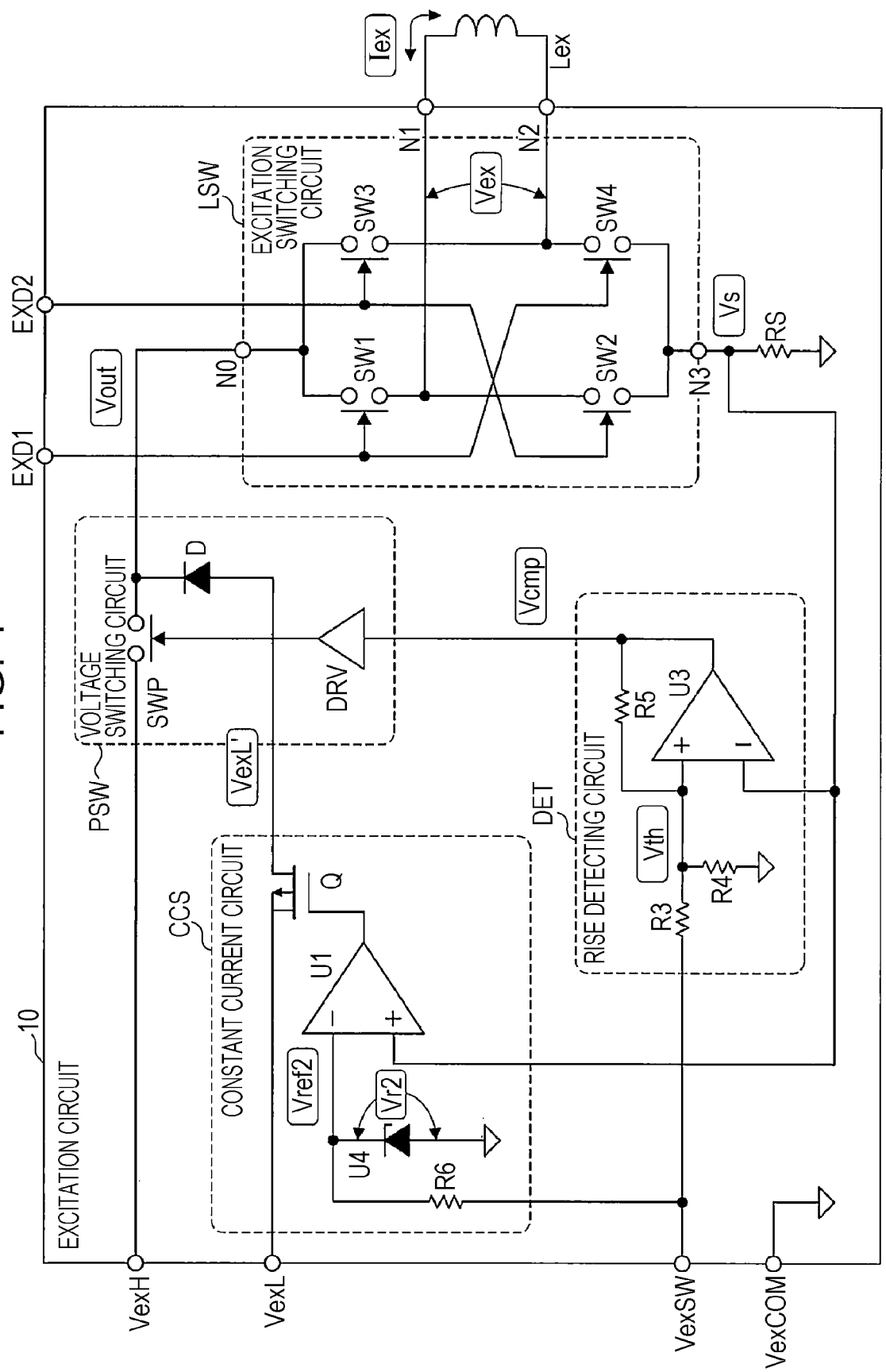
FIG. 4 is a circuit diagram illustrating an excitation circuit according to a second embodiment.

Next, the excitation circuit 10 according to a second embodiment of the present disclosure will be described with reference to FIG. 4. FIG. 4 is a circuit diagram illustrating the excitation circuit 10 according to the second embodiment.

In the first embodiment, a description has been given of a case where, in the constant current circuit CCS, the operational amplifier U1 compares the reference voltage Vref1 with the input voltage Vin of the source terminal of the transistor Q on the basis of the low excitation voltage VexL to make the current of the low excitation voltage VexL to be supplied to the voltage switching circuit PSW constant. In the second embodiment, a description will be given of the case of making the current of the low excitation voltage VexL constant by comparing, by the operational amplifier U1, a detected voltage (second detected voltage) Vs that changes in accordance with the excitation current Iex with a reference voltage (second reference voltage) Vref2 on the basis of the ground potential VexCOM.

That is, in the constant current circuit CCS according to the second embodiment, the source terminal (input terminal) of the transistor Q is applied with the low excitation voltage VexL, and the drain terminal (output terminal) of the transistor Q is connected to the anode terminal of the diode D of the voltage switching circuit PSW. The gate terminal (control terminal) of the transistor Q is connected to the output terminal of the operational amplifier U1.

The inverting input terminal (−) of the operational amplifier U1 is connected to the ground potential VexCOM with a constant voltage output element U4 such as a shunt voltage reference element interposed therebetween. The inverting input terminal (−) receives the reference voltage (second reference voltage) Vref2 that is higher than the ground potential VexCOM by a drop voltage (constant voltage) Vr2 of the constant voltage output element U4. In this case, the cathode terminal (input terminal) of the constant voltage output element U4 is connected to the rise detecting voltage VexSW with a resistance element R6 interposed therebetween, the anode terminal (output terminal) of the constant voltage output element U4 is connected to the ground potential VexCOM, and the inverting input terminal (−) of the operational amplifier U1 is connected to the cathode terminal of the constant voltage output element U4.

The non-inverting input terminal (+) of the operational amplifier U1 is connected between the excitation switching circuit LSW (N3) and the resistance element (second current detecting element) RS connected between the excitation switching circuit LSW and the ground potential VexCOM, and receives the detected voltage (second detected voltage) Vs higher than the ground potential VexCOM by the voltage generated by the resistance element RS in accordance with the excitation current Iex. Here, the detected voltage Vs also serves as the detected voltage (third detected voltage) input to the comparator U3 of the rise detecting circuit DET, and the resistance element RS also serves as the resistance element RS (third current detecting element) that generates the detected voltage of the rise detecting circuit DET. Alternatively, separate detected voltages Vs and separate resistance elements RS may be provided.

Accordingly, the reference voltage Vref2 is compared with the detected voltage Vs by the operational amplifier U1, and the transistor Q is controlled in accordance with an obtained result of the comparison. Thus, the transistor Q controls the current value of the low excitation voltage VexL so that the reference voltage Vref2 equals the detected voltage Vs. As a result, the current of the low excitation voltage VexL to be supplied to the voltage switching circuit PSW is made constant.

Advantages of Second Embodiment

As described above, in the second embodiment, the constant current circuit CCS may include the transistor Q including an input terminal supplied with the low excitation voltage VexL and an output terminal connected to the voltage switching circuit PSW; and the operational amplifier U1 that compares the reference voltage Vref2 higher than the ground potential VexCOM by the constant voltage Vr2 with the detected voltage Vs higher than the ground potential VexCOM by the voltage generated by the resistance element RS in accordance with the excitation current Iex and that controls the transistor Q on the basis of an obtained result of the comparison.

Accordingly, the excitation current Iex is made constant on the basis of the ground potential VexCOM, which makes it possible to stably make the current of the low excitation voltage VexL constant even when the value of the low excitation voltage VexL fluctuates. Compared with the constant current circuit CCS illustrated in FIG. 1, the resistance element R1 is not necessary, and a drop of the low excitation voltage VexL in the resistance element R1 can be avoided.

Extended Embodiments

While the present disclosure has been described with reference to embodiments, the present disclosure is not limited to the above embodiments. Various changes understandable by a person skilled in the art may be added to the configuration and details of the present disclosure within the scope of the present disclosure. The embodiments may be implemented arbitrarily in combination without inconsistency.

What is claimed is:

1. An excitation circuit comprising:
    an excitation switching circuit that switches, in each of a positive excitation period and a negative excitation period repeated at a constant interval, a polarity of an excitation current to be supplied to an excitation coil of an electromagnetic flowmeter between a positive polarity and a negative polarity;
    a rise detecting circuit that detects, in each of the positive excitation period and the negative excitation period, a rise point at which a current value of the excitation current reaches a set current value that is set in advance;
    a voltage switching circuit that applies a high excitation voltage to the excitation switching circuit during a period from an excitation period starting point to the rise point in each of the positive excitation period and the negative excitation period, and applies a low excitation voltage lower than the high excitation voltage to the excitation switching circuit during a period from the rise point to an excitation period ending point in each of the positive excitation period and the negative excitation period; and
    a constant current circuit that makes a current of the low excitation voltage to be supplied to the voltage switching circuit constant.

2. The excitation circuit according to claim 1, wherein the constant current circuit includes
    a transistor including an input terminal that is supplied with the low excitation voltage through a first current detecting element and an output terminal that is connected to the voltage switching circuit, and
    an operational amplifier that makes a comparison between a first detected voltage with a first reference voltage and that controls the transistor on the basis of an obtained result of the comparison, the first detected voltage being lower than the low excitation voltage by a drop voltage generated by the first current detecting element in accordance with a current flowing through the transistor, the first reference voltage being lower than the low excitation voltage by a constant voltage.

3. The excitation circuit according to claim 1, wherein the constant current circuit includes
   a transistor including an input terminal that is supplied with the low excitation voltage and an output terminal that is connected to the voltage switching circuit, and
   an operational amplifier that makes a comparison between a second detected voltage with a second reference voltage and that controls the transistor on the basis of an obtained result of the comparison, the second detected voltage being higher than a ground potential of the excitation circuit by a voltage generated by a second current detecting element in accordance with the excitation current, the second reference voltage being higher than the ground potential by a constant voltage.

4. The excitation circuit according to claim 1, wherein the rise detecting circuit includes
   a comparator including a first input terminal that receives a threshold voltage higher than a ground potential of the excitation circuit by a constant voltage, a second input terminal that receives a third detected voltage higher than the ground potential by a voltage generated by a third current detecting element that detects the excitation current, and an output terminal, and
   the comparator makes a comparison between the threshold voltage and the third detected voltage and outputs, on the basis of an obtained result of the comparison, a comparison output signal indicating the rise point from the output terminal to the voltage switching circuit, the comparison being performed on the basis of a hysteresis characteristic that is obtained by shifting an input voltage of the first input terminal or the second input terminal in accordance with the comparison output signal.

5. The excitation circuit according to claim 1, wherein the rise detecting circuit includes
   a comparator including a non-inverting input terminal that receives a threshold voltage which is higher than a ground potential of the excitation circuit by a constant voltage and which has a constant output resistance value, an inverting input terminal that receives a third detected voltage higher than the ground potential by a voltage generated by a third current detecting element that detects the excitation current, and an output terminal that outputs a comparison output signal indicating the rise point to the voltage switching circuit on the basis of a result of a comparison between the threshold voltage and the third detected voltage, and
   a resistance element including a first end connected to the non-inverting input terminal of the comparator and a second end connected to the output terminal of the comparator.

6. An electromagnetic flowmeter comprising:
   an excitation coil that generates a magnetic field in a direction perpendicular to a flow direction of a fluid flowing in a measuring pipe;
   an excitation circuit that switches a polarity of an excitation current to be supplied to the excitation coil at a constant interval;
   a pair of detecting electrodes that detects an electromotive force generated in the fluid; and
   a control circuit that calculates a flow rate of the fluid from the electromotive force detected by the pair of detecting electrodes,
   wherein the excitation circuit includes the excitation circuit according to claim 1.

* * * * *